(12) United States Patent
Eom et al.

(10) Patent No.: US 9,143,604 B2
(45) Date of Patent: Sep. 22, 2015

(54) PERSONALIZED SERVICE METHOD USING USER HISTORY IN MOBILE TERMINAL AND SYSTEM USING THE METHOD

(75) Inventors: Ki Wan Eom, Seoul (KR); Hyoung Gook Kim, Yongin-si (KR); Jeong Mi Cho, Suwon-si (KR); Jae Won Lee, Seoul (KR); Jung Eun Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 631 days.

(21) Appl. No.: 11/826,169

(22) Filed: Jul. 12, 2007

(65) Prior Publication Data
US 2008/0171573 A1 Jul. 17, 2008

(30) Foreign Application Priority Data
Jan. 11, 2007 (KR) .................. 10-2007-0003237

(51) Int. Cl.
H04M 1/00 (2006.01)
H04M 11/10 (2006.01)
H04M 1/725 (2006.01)

(52) U.S. Cl.
CPC ...... *H04M 1/72572* (2013.01); *H04M 1/72569* (2013.01)

(58) Field of Classification Search
USPC .......... 455/556.2, 414.1, 414.2, 414.3, 456.3, 455/456.5, 456.6, 566; 345/473; 348/343, 348/14.06
See application file for complete search history.

(56) References Cited

U.S. PATENT DOCUMENTS 7,242,952 B2 * 7/2007 Shirai et al. .................. 455/567
7,283,813 B2 * 10/2007 Hamanaga et al. ........... 455/415
8,510,567 B2 * 8/2013 Alderucci et al. ............ 713/186
2004/0003706 A1 * 1/2004 Tagawa et al. .................. 84/609
2004/0192269 A1 * 9/2004 Hill ............................ 455/414.1
2006/0224046 A1 * 10/2006 Ramadas et al. .............. 600/300
2006/0227223 A1 * 10/2006 Nagata ........................ 348/231.5
2007/0190983 A1 * 8/2007 Goldfarb et al. ........... 455/414.1

FOREIGN PATENT DOCUMENTS

KR 10-2006-0047890 5/2006

OTHER PUBLICATIONS

Korean Office Action dated Dec. 27, 2007 in corresponding Korean Patent Application No. 10-2007-0003237 (4 pages).

* cited by examiner

*Primary Examiner* — Kent Chang
*Assistant Examiner* — Scott Au
(74) *Attorney, Agent, or Firm* — Staas & Halsey LLP (57) ABSTRACT

A personalized service method using a user history in a mobile terminal is provided. The personalized service method using the user history in the mobile terminal includes: checking at least one of event information and context information which occurred due to a user; checking a user's location, a user's condition, a user's emotional state, or an event occurrence time when the at least one of event information and context information occur; reflecting the user's location, the user's condition, the user's emotional state, or the event occurrence time in the at least one of event information and context information, and recording the at least one of event information and context information, having reflected the user's location, the user's condition, the user's emotional state, or the event occurrence time, in a database in a diary type; and displaying a representing image corresponding to the at least one of event information and context information, having been recorded in the diary type.

18 Claims, 7 Drawing Sheets

PERSONALIZED SERVICE METHOD USING USER HISTORY IN MOBILE TERMINAL AND SYSTEM USING THE METHOD

CROSS-REFERENCE TO RELATED APPLICATION

This application claims the benefit of Korean Patent Application No. 10-2007-0003237, filed on Jan. 11, 2007, in the Korean Intellectual Property Office, the disclosure of which is incorporated herein by reference.

BACKGROUND OF THE INVENTION

1. Field of the Invention

The present invention relates to a personalized service method using a user history in a mobile terminal and a system using the method, and more particularly, to a personalized service method using a user history in a mobile terminal and a system using the method which can provide the user with a differentiated personalized service using the user history by collecting sequential interactions or context information occurring between a mobile terminal and the user, and by managing the collected sequential interactions or the context information as the user history.

2. Description of Related Art

Currently, a mobile terminal can perform a simple function such as a call, and also can perform multi-functions with a single terminal by blending various digital multimedia services such as an MPEG Audio Layer-3 (MP3) play service, Digital Multimedia Broadcasting (DMB) service, navigation service, the Internet service, and the like. Also, the mobile terminal can perform a function of a portal storage device since the mobile terminal has sufficient memory space for contents due to a decrease of a memory price, and miniaturization.

With this trend, the mobile terminal comes to be positioned as a most popular interactive target device for a user, and is required to provide the user with a personalized service by using interactive information which is capable of understanding user's inclination or a motion pattern.

In a conventional mobile personalized service method, a wireless Internet service is provided, however a process mechanism which can correspond to personalized feature information, such as a personal inclination, a personal location, and a personal taste, and a personal request, is not provided.

In a conventional mobile personalized service system, the system includes: a client module in which the user inputs a user context, and generating the inputted user context as ontology data; an agent module analyzing the inputted user context from the ontology data, and recommending service candidates appropriate for the inputted user context; a server module being received the service candidates appropriate for the inputted user context from the agent module to transmit service candidates which fulfill the user context to the agent module, and transmitting the service candidates which are recommended by the agent module to the client module. However, since the conventional mobile personalized service method collects the user context information, transmits the collected user context information to a personalized service engine based on a wireless network or an Internet protocol (IP), and just provides an individual with a differentiated web service, various personalized services according to a personal history can not be provided to the individual.

In a conventional user context diary method in a mobile terminal, there is provided an application program which records to manage the context information from the mobile terminal, this just provides the context information of the mobile terminal in a diary type, and this can not adopt the user history.

In a conventional personalized information recommendation service method, personalized information such as contact information, public documents, caller/receiver numbers, user information of a recommended group is provided based on opening information between users. However, the conventional personalized information recommendation service method can not variously fulfill personalized service requests since the conventional personalized information recommendation service method defines items of sharing information and a degree of the sharing information in a user terminal and associated user services, recommends lists and contact numbers which are determined to be necessary to the user, and just provides the users with the caller/receiver numbers and personal information of the caller/receiver via the mobile terminal.

BRIEF SUMMARY

An aspect of the present invention provides a personalized service method and a system using the method which collects interactions and context information occurring between a user and a mobile terminal, and manages the collected interactions and context information as a user history. Based on the collecting and managing, a differentiated personalized service may be provided.

Another aspect of the present invention also provides a personalized service method and a system using the method which can communicate with other people in a community by sharing information about sequential events occurring in a mobile terminal.

Still another aspect of the present invention also provides a personalized service method and a system using the method which can understand a user inclination based on a user history by using a mobile terminal, and provide a user with an automation service for the mobile terminal according to the user's inclination.

According to an aspect of the present invention, there is provided a personalized service method using a user history in a mobile terminal including: checking event information and context information which occurred due to a user; checking a user's location, a user's condition, a user's emotional state, and an event occurrence time when the event information and the context information occur; reflecting the user's location, the user's condition, the user's emotional state, and the event occurrence time in the event information and the context information, and recording the event information and the context information, having reflected the user's location, the user's condition, the user's emotional state, and the event occurrence time, in a database in a diary type; and displaying a representing image corresponding to the event information and the context information, having been recorded in the diary type.

In an aspect of the present invention, there is provided a personalized service system using a user history in a mobile terminal including: a first detector detecting event information and context information which occurred due to a user; a second detector detecting a user's location, a user's condition, a user's emotional state, and an event occurrence time when the event information and the context information occur; a database reflecting the user's location, the user's condition, the user's emotional state, and the event occurrence time in the event information and the context information, and recording the event information and the context information, having reflected the user's location, the user's condition, the user's emotional state, and the event occurrence time, in a database in a diary type; and a diary displayer displaying a representing image corresponding to the event information and the context information, having been recorded in the diary type.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
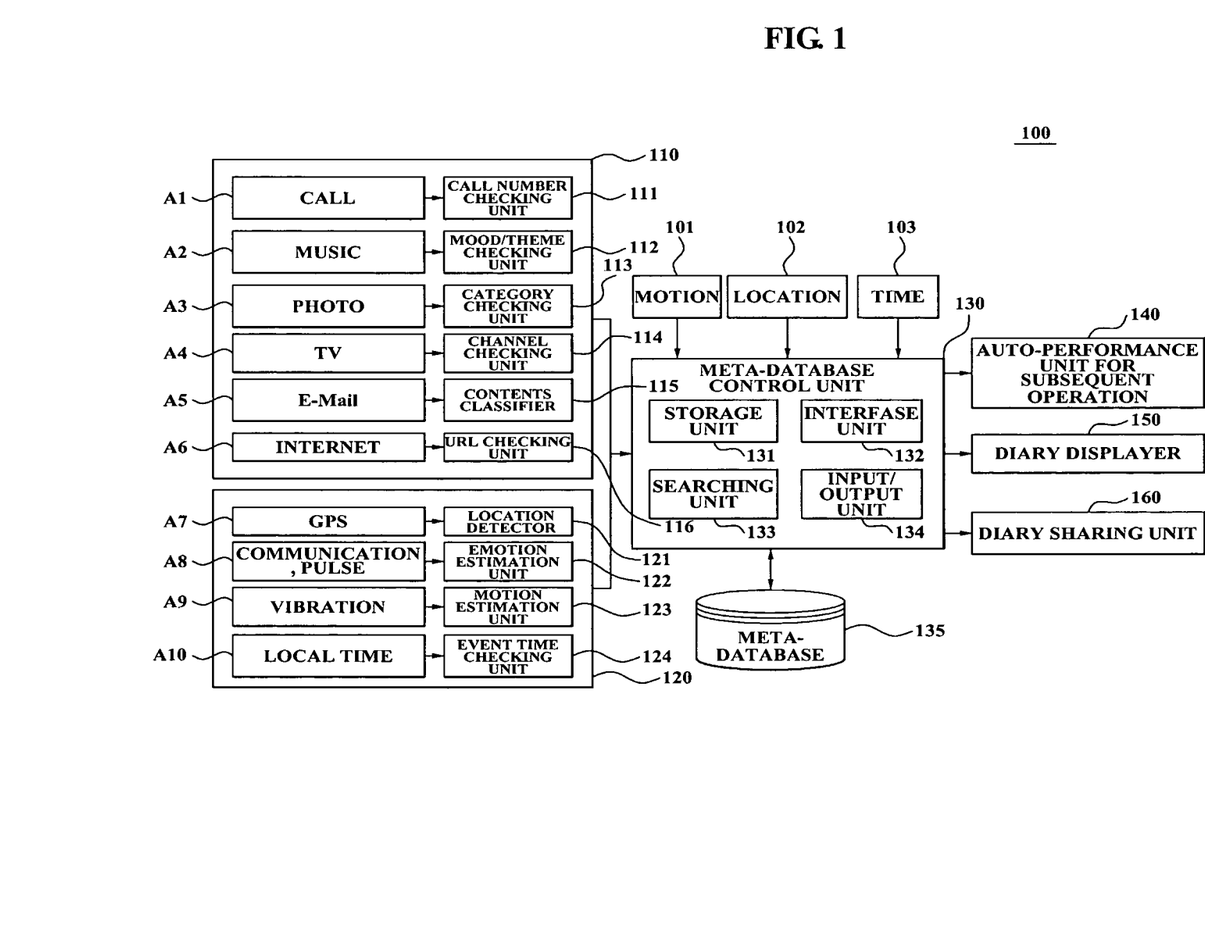
FIG. 1 is a diagram illustrating a configuration of a personalized service system using a user history in a mobile terminal according to an embodiment of the present invention.

FIG. 1 is a diagram illustrating a configuration of a personalized service system 100 using a user history in a mobile terminal according to an embodiment of the present invention.

Referring to FIG. 1, the personalized service system 100 using the user history in the mobile terminal according to an embodiment of the present invention includes a first detector 110, a second detector 120, a meta-database control unit 130, a meta-database 135, a auto-performance unit for subsequent operation 140, a diary displayer 150, and a diary sharing unit 160.

The first detector 110 detects at least one of event information or context information occurring due to a user of the mobile terminal. The first detector 110 includes a call number checking unit 111, a mood/theme checking unit 112, a category checking unit 113, a channel checking unit 114, a contents classifier 115, and a URL checking unit 116. The call number checking unit 111 checks a caller's phone number or a receiver's phone number according to a call event A1 with respect to an incoming call or an outgoing call when the call event A1 with respect to the incoming call or the outgoing call occurs due to the user of the mobile terminal. The mood/theme checking unit 112 checks a mood or a theme of music which is played according to a music event A2 when the music event A2 occurs due to the user of the mobile terminal. The category checking unit 113 checks a category of a photo according to a photo event A3 when the photo event A3 occurs due to the user of the mobile terminal. The category of the photo may be categorized as a person, a view, an inside, and an outside. The channel checking unit 114 checks a channel viewed or listened by the user when the TV event A4 occurs due to the user of the mobile terminal, e.g. when the user views/listens to any one of the channel of a television (TV) broadcast, a Digital Multimedia Broadcasting DMB broadcast, and a radio broadcast. The contents classifier 115 classifies transmitted/received contents when the e-mail event A5 occurs due to the user of the mobile terminal, e. g. when the e-mail, a short message service (SMS), and a multimedia message service (MMS) are transmitted/received. The URL checking unit 116 checks Uniform Resource Locator (URL) information of a connected site according to a connection event A6 when the connection event A6 occurs due to the user of the mobile terminal. As described above, the first detection unit 110 may detect the event information and the context information possibly occurring due to the user of the mobile terminal via the call number checking unit 111, the mood/theme checking unit 112, the category checking unit 113, the channel checking unit 114, the contents classifier 115, or the URL checking unit 116.

The second detection unit 120 detects a user's location, a user's condition, a user's emotional state, or an event occurrence time when the at least one of event information and context information occur. The second detection unit 120 includes a location detector 121, an emotion estimation unit 122, a motion estimation unit 123, and an event time checking unit 124. The location detector 121 receives global positioning system (GPS) information from a GPS A7, which is equipped in the mobile terminal or is connected with the mobile terminal, and detects the user's location information by analyzing the received GPS information. The emotion estimation unit 122 estimates the user's emotional state from a user's speech communication pattern or a vital sign signal such as a pulse A8 detected from the user. Specifically, the emotion estimation unit 122 may estimate the user's emotional state as being excited based on a result of an analysis of the speech communication pattern when the user's communication speed is accelerated or speech tone becomes higher. The emotion estimation unit 122 may estimate the user's emotional state as being excited when an interval of the pulse A8 of the vital sign becomes shorter. The motion estimation unit 123 estimates a user's motion from a vibration A9 of the mobile terminal. Specifically, the motion estimation unit 123 may estimate the user's motion as being moving or exercising based on the vibration A9 of the mobile terminal, when the vibration A9 is greater than a reference value. The event time estimation unit 124 checks a local time A10 when the at least one of event information and context information A1 through A9 occur.

The meta-database control unit 130 manages the at least one of event information and context information occurring due to the user of the mobile terminal as metadata according to the present invention. The meta-database control unit 130 may directly receive motion information 101 performed by the user of the mobile terminal, location information 102, or time information 103. The meta-database control unit 130 may receive the at least one of event information and context information from the first detection unit 110. The meta-database control unit 130 may receive information such as the user's location, the user's condition, the user's emotional state, or the event occurrence time from the second detection unit 120. The meta-database control unit 130 may manage a user history to be recorded in a meta-database 135 in a diary type by using the metadata including the event information, the context information, the user's location, the user's condition, the user's emotional state, or the event occurrence time. The meta-database control unit 130 includes a storage unit 131, an interface unit 132, a searching unit 133, and an input/output unit 134. The storage unit 131 stores various types of data necessary for the personalized service using the user history. The interface unit 132 performs an interface with various types of devices which interoperate with the mobile terminal or with the personalized system 100. The searching unit 133 searches for data stored in the storage unit 131 or the metadata recorded in the meta-database 135. The input/output unit 134 receives the data inputted by the user, or outputs required data to the user via the personalized service 100.

The meta-database 135 reflects the user's location, the user's condition, the user's emotional state, or the event occurrence time in the at least one of event information and context information, and records the at least one of event information and context information, having reflected the user's location, the user's condition, the user's emotional state, or the event occurrence time, in the meta-database in the diary type.

The auto-performance unit for a subsequent operation 140 refers to the at least one of event information and context information, having been recorded in the diary type, and automatically performs a subsequent operation when the user selects a menu.

Specifically, when the user selects the music play menu, the auto-performance unit for the subsequent operation 140 analyzes a user history associated with the music play menu, having been recorded in the diary type, and automatically performs the subsequent operation to play music which is determined based on a result of the analysis. As an example, as the result of the analysis of the user history associated with the music play menu, when the user frequently listens to exciting music whenever getting up at 6 o'clock in the morning, the exciting music may be automatically played when the user selects the music menu at 6 o'clock in the morning. The user may change the exciting music to different music when the user uncharacteristically wants to listen to the different music after listening to the exciting music.

As another example, when the user selects the broadcast menu, the auto-performance unit for the subsequent operation 140 analyzes a user history associated with the broadcast menu, having been recorded in the diary type, and automatically performs the subsequent operation to provide broadcast of a channel which is determined based on a result of the analysis. As an example, as the result of the analysis of the user history associated with the broadcast menu, when the user views a channel 1 via DMB broadcast at 9 o'clock in the evening, the channel 1 may be automatically provided when the user selects the broadcast menu at 9 o'clock in the evening. The user may change the channel 1 to a different channel when the user uncharacteristically wants to view the different channel after viewing the channel 1.

The diary display unit 150 displays a representing image corresponding to the at least one of event information and context information, having been recorded in the diary type.

Figure 2:
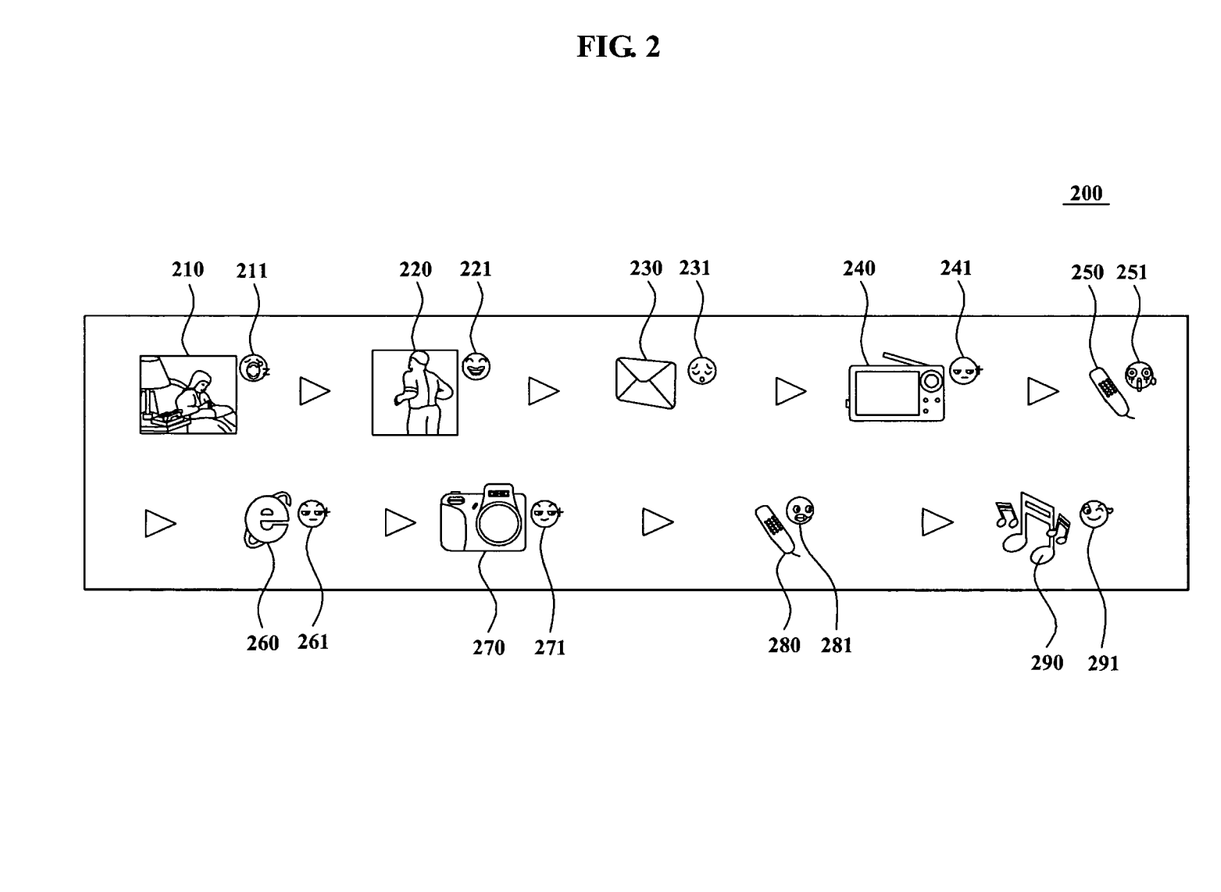
FIG. 2 is a diagram illustrating examples of brief displays with respect to an event in a diary using a user history in a mobile terminal according to an embodiment of the present invention.

As illustrated in FIG. 2, the diary display unit 150 displays brief information about the event information in the diary type using an event icon which shows an event content, the event occurrence time, the user's location, or an emoticon which shows the user's emotional state.

FIG. 2 is a diagram illustrating examples of brief displays 200 with respect to an event in a diary using a user history in a mobile terminal according to the present invention.

Referring to FIG. 2, the brief displays 200 with respect to the event in the diary using the user history in the mobile terminal are illustrated.

An event icon 210 corresponds to a weather condition when the user of the mobile terminal wakes up. An emoticon 211 corresponds to an emotional state when the user of the mobile terminal wakes up. The motion estimation unit 123 of FIG. 1 may estimate that the user is awake when the mobile terminal is vibrated by the user after the mobile terminal outputs an alarm at a morning call time according to a morning call function in the case that the user has set up the morning call function. Also, the emotion estimation unit 122 of FIG. 1 may estimate that the user is sleepy via a speech communication pattern or a pulse of a vital signal when the user is awake.

A reference number 220 indicates an event icon corresponding to an exercise state while the user is doing an exercise. A reference number 221 indicates the emoticon corresponding to emotion information according to the exercise state. The motion estimation unit 123 of FIG. 1 may estimate the user is doing an exercise when the vibration of the mobile terminal is great. The emotion estimation unit 122 of FIG. 1 may estimate the user is in a good mood via the speech communication pattern or the pulse of the vital sign of the user while the user is doing the exercise.

An event icon 230 corresponds to e-mail transmitting/receiving status when the user transmits/receives the e-mail via the mobile terminal. A reference number 231 indicates an emoticon corresponding to an emotional state according to a result of the transmitting/receiving the e-mail. The contents classifier 114 of FIG. 1 may classify contents of the transmitted/received e-mail when the user transmits/receives the e-mail via the mobile terminal. The emotion estimation unit 122 of FIG. 1 may estimate a user's emotional state via the speech communication pattern or the pulse of the vital sign after the user transmits/receives the e-mail.

An event icon 240 corresponds to statuses of TV broadcast, DMB broadcast, and radio broadcast when the user views/listens to any one of the TV broadcast, the DMB broadcast, and the radio broadcast. An emoticon 241 corresponding to an emotional state when the user views/listens to any one of the TV broadcast, the DMB broadcast, and the radio broadcast. The channel checking unit 115 may check information about a channel/station of the TV broadcast, the DMB broadcast, or the radio broadcast that the user views/listens to. The emotion estimation unit 122 of FIG. 1 may estimate the user's emotional state via the speech communication pattern or the pulse of the vital sign of the user while the user is viewing or listening to the broadcasts.

An event icon 250 corresponds to a status of receiving a call when the user receives the call via the mobile terminal. An emoticon 251 corresponds to the emotional state of the user due to the receiving of the call via the mobile terminal. The call number checking unit 111 of FIG. 1 checks a calling number received via the mobile terminal as a result of the receiving of the call via the mobile terminal. The emotion estimation unit 122 of FIG. 1 may estimate that the user is surprised due to the speech communication pattern or the pulse of the vital sign of the user the when the user has received the call.

An event icon 260 corresponds to an Internet use when the user uses the Internet via the mobile terminal. An emoticon 261 corresponds to an emotional state according to the Internet use. The URL checking unit 116 of FIG. 1 checks URL information of a website to which the user connects via the mobile terminal. The emotion estimation unit 122 of FIG. 1 may estimate the emotional state of the user via the speech communication pattern or the pulse of the vital sign of the user while the user is using the Internet.

An event icon 270 corresponds to taking a photo when the user takes the photo via the mobile terminal. An emoticon 271 corresponds to an emotional state when the user is in an event associated with the photo. The category checking unit 113 of FIG. 1 checks a category of the photo taken via the mobile terminal. The emotion estimation unit 122 of FIG. 1 may estimate the emotional state of the user via the speech communication pattern or the pulse of the vital sign of the user the while the user is taking the photo.

An event icon 280 corresponds to a calling status when the user makes a call via the mobile terminal. An emoticon 281 corresponds to an emotional state while the user is making the call. The call number checking unit 111 of FIG. 1 checks a calling number according to the calling via the mobile terminal. The emotion estimation unit 122 of FIG. 1 may estimate, for example, the user is upset via the speech communication pattern or the pulse of the vital sign of the user the while the user is taking the photo.

An event icon 290 corresponds to a listening status when the user listens to music via the mobile terminal. An emoticon 291 corresponds to an emotional state when the user listens to the music. The mood/theme checking unit 112 of FIG. 1 checks a mood/theme with respect to the music listened to by the user via the mobile terminal. The emotion estimation unit 122 of FIG. 1 may estimate the emotional state of the user by the speech communication pattern or the pulse of the vital sign of the user the while the user listens music.

As another example, a case in which the diary display unit 150 displays detailed information about the event content, the event occurrence time, the user's location, or the user's emotion information when the representing image is selected by the user, is used.

Figure 3:
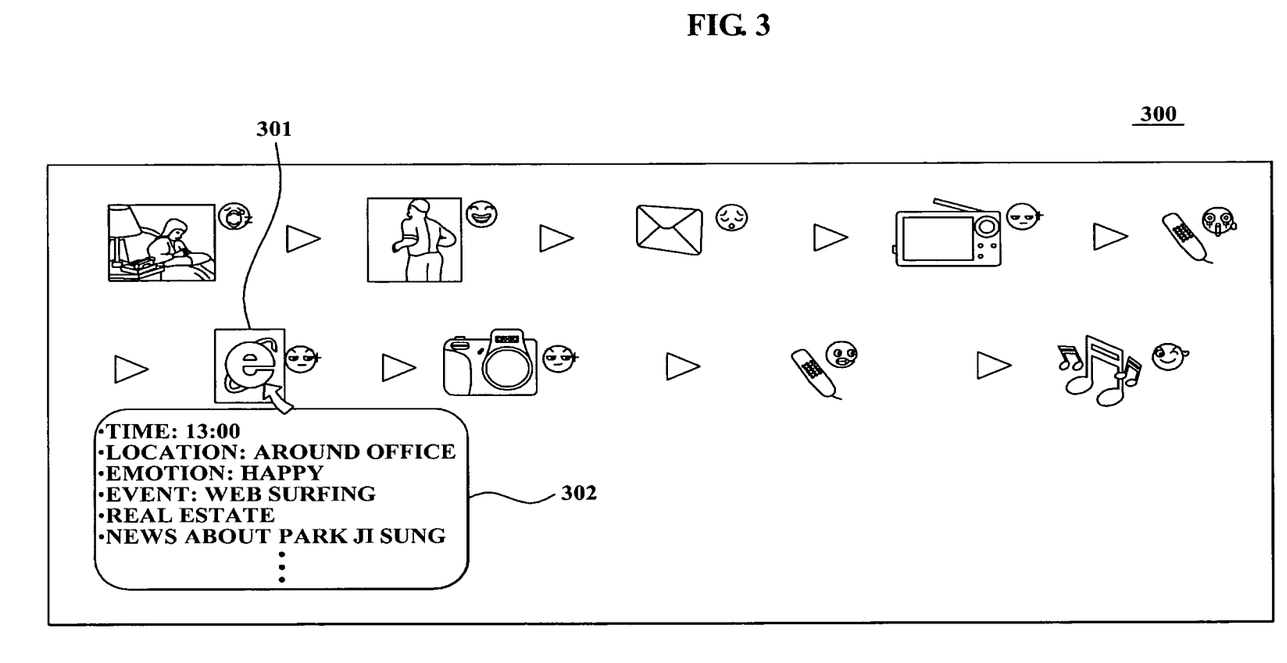
FIG. 3 is a diagram illustrating examples of detailed displays with respect to an event which is selected in a diary using a user history in a mobile terminal according to an embodiment of the present invention.

FIG. 3 is a diagram illustrating examples of a detailed display with respect to an event which is selected in a diary using a user history in a mobile terminal according to the present invention.

Referring to FIG. 3, the detailed displays of detailed information 300 about an event content, an event occurrence time, a user's location, and a user's emotion information.

A status 301 is a representing image selected by a user. Detailed information 302 is associated with an event corresponding to the selected representing image. As an example, when the user web surfs, the detailed information may include information such as a web surfing time, a user's location during the web surfing, a user's emotional state, or a record with respect to the web surfing. The event time checking unit 124 of FIG. 1 may check a local time when the user is web surfing via a mobile terminal. The location detector 121 of FIG. 1 may detect the user's location using GPS information when the user is web surfing via a mobile terminal. The emotion estimation unit 122 of FIG. 1 may estimate a user's emotional state using user's speech communication pattern or a pulse of a vital sign while the user is web surfing via a mobile terminal. The URL checking unit 116 may check URL information according to the web surfing while the user is web surfing via a mobile terminal.

As still another example, the diary display unit 150 of FIG. 1 displays detailed record information about the event along with the representing image corresponding to the event context, the event occurrence time, the user's location, or the user's emotion information.

Figure 4:
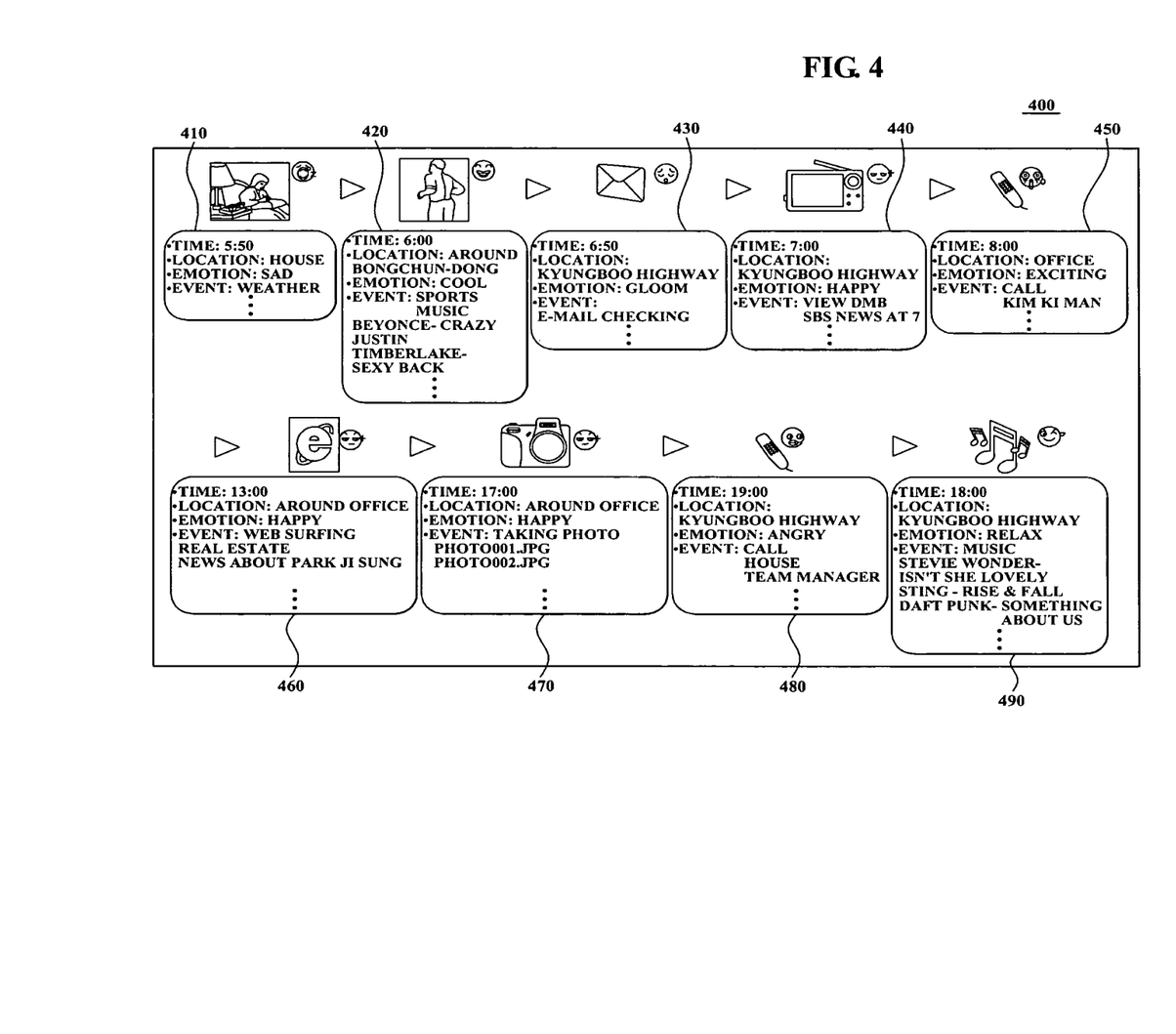
FIG. 4 is a diagram illustrating an example of a detailed context about an event recorded in a diary using a user history in a mobile terminal according to an embodiment of the present invention.

FIG. 4 is a diagram illustrating an example of a detailed context about an event recorded in a diary using a user history in a mobile terminal according to the present invention.

Referring to FIG. 4, a reference number indicates a display 400 which displays detailed record information about the event along with a representing image corresponding to an event context, a event occurrence time, a user's location, and user's emotion information.

Detailed information about a get-up event 410 may include time information about when the get-up event occurs, location information of where the get-up event occurs, or the user's emotion information when the get-up event occurs.

Detailed information about an exercise event 420 may include time information about when the exercise event occurs, location information where the exercise event occurs, the user's emotional state information when the exercise event occurs, the exercise event information, or music information while the exercise event is occurring.

Detailed information about an e-mail event 430 may include time information about when the e-mail event occurs, location information where the e-mail event occurs, user's emotional state information when the e-mail event occurs, or e-mail event information.

Detailed information about a broadcast viewing/listening event 440 may include time information about when the broadcast viewing/listening event occurs, location information where broadcast viewing/listening event occurs, the user's emotional state information when the broadcast viewing/listening event occurs, or broadcast program information according to the broadcast viewing/listening event.

Detailed information about call connection events 450 and 480 may include time information about when the call connection event occurs, location information where the call connection event occurs, the user's emotional state information when the call connection event occurs, or call caller/receiver information according to the call connection event.

Detailed information about a web surfing event 460 may include time information about when the web surfing event occurs, location information where the web surfing event occurs, the user's emotional state information while the web surfing event is occurring, or web surfing record information according the web surfing event.

Detailed information about a photo taking event 470 may include time information about when the photo taking event occurs, location information where the photo taking event occurs, the user's emotional state information while the photo taking event is occurring, or photo information according the photo taking event.

Detailed information about a music listening event 490 may include time information about when the music listening event occurs, location information where the music listening event occurs, the user's emotional state information while the music listening event is occurring, or music information according the music listening event.

The diary sharing unit 160 of FIG. 1 forms a community with other users via a network connection environment or a web connection environment, and shares user diary information via the community.

Figure 5:
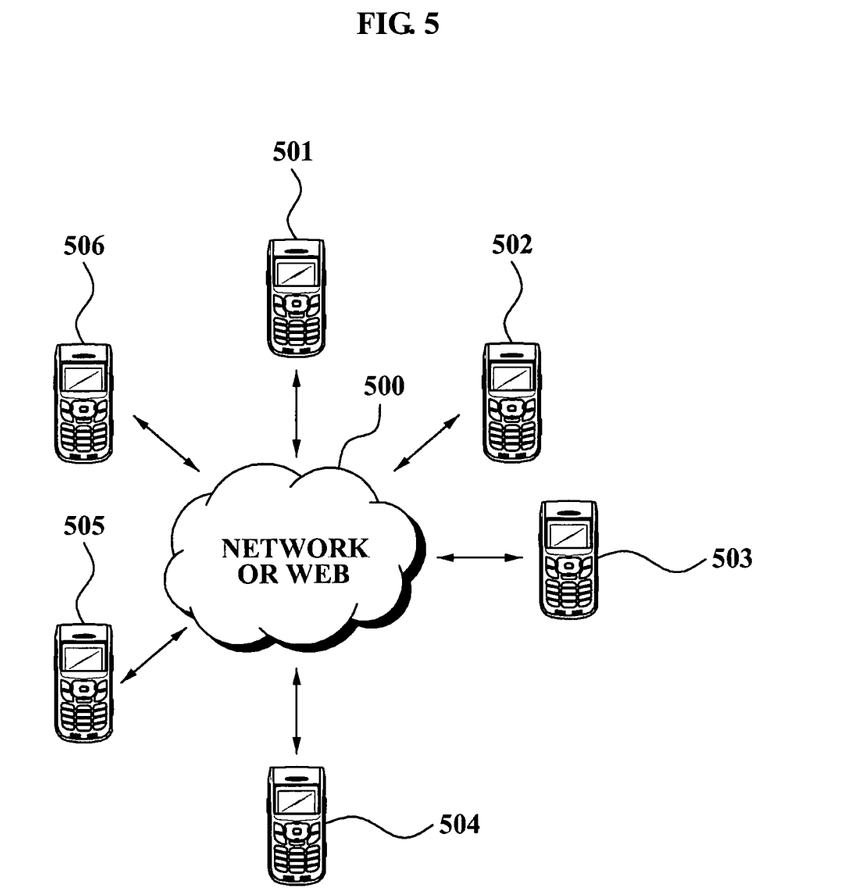
FIG. 5 is a diagram illustrating an example of forming a community in a mobile terminal according to an embodiment of the present invention.

FIG. 5 is a diagram illustrating an example of forming a community in a mobile terminal 501 according to an embodiment of the present invention.

Referring to FIG. 5, the mobile terminal 501 forms a community with other mobile terminals 502 through 506 via a network or a web 500, and the diary sharing unit 160 of FIG. 1 shares user diary information via the formed community. Specifically, the personalized service system 100 of FIG. 1, when viewing a user history of the mobile terminal, and when a photo is frequently taken, forms the community of users having a common interest by using this feature, along with users of other mobile terminals 502 through 506, and the user history is shared by the diary sharing unit 160 of FIG. 1 with the community.

Figure 6:
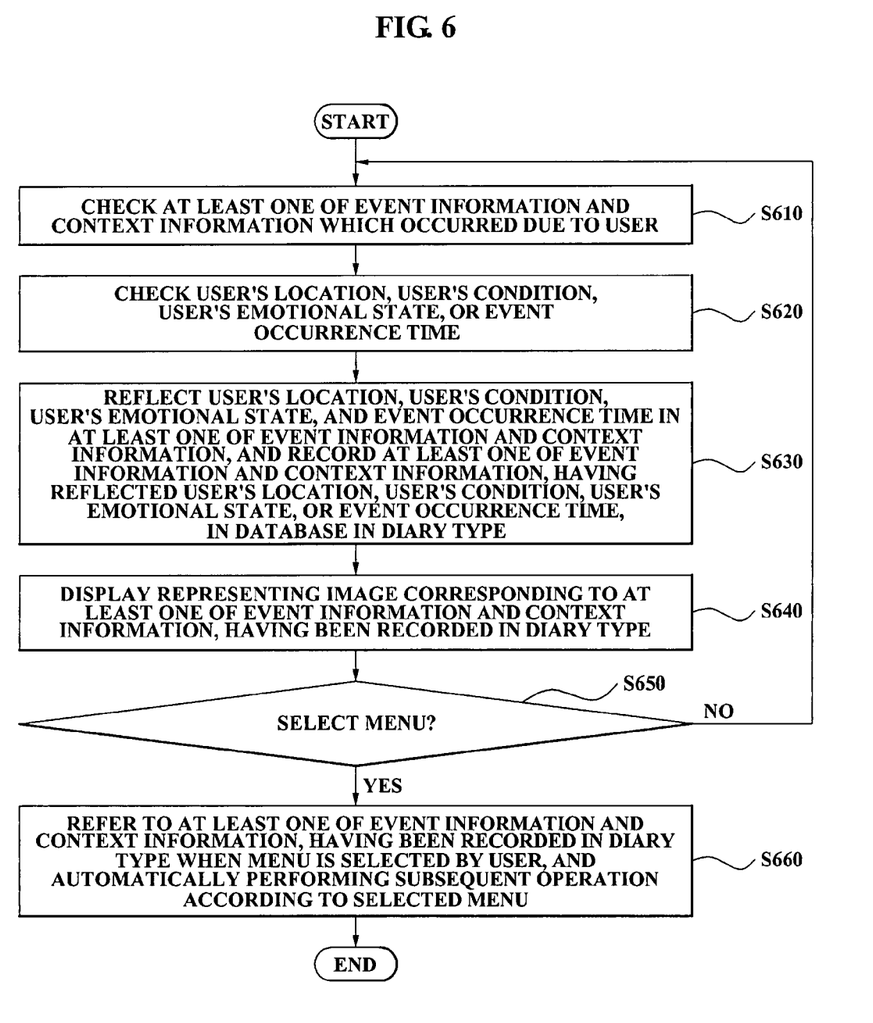
FIG. 6 is a flowchart illustrating a personalized service method using a user history in a mobile terminal according to another embodiment of the present invention.

FIG. 6 is a flowchart illustrating a personalized service method using a user history in a mobile terminal according to another embodiment of the present invention.

Referring to FIGS. 1 through 6, in operation S610, the personalized service system 100 checks at least one of event information and context information occurring due to a user of the mobile terminal. Specifically, in operation S610, the personalized service system 100 checks the at least one of event information and context information occurring in the mobile terminal via the first detector 110.

In operation S620, the personalized service system 100 checks a user's location, a user's condition, a user's emotional state, or an event occurrence time when the at least one of event information and context information occurs in the mobile terminal. Specifically, in operation S620, the personalized service system 100 checks the user's location, the user's condition, the user's emotional state, or the event occurrence time via the second detector 120 when the at least one of event information and context information occurs in the mobile terminal.

In operation S630, the personalized service system 100 reflects the user's location, the user's condition, the user's emotional state, or the event occurrence time in the at least one of event information and context information, and records the at least one of event information and context information, having reflected the user's location, the user's condition, the user's emotional state, or the event occurrence time, in the meta-database 135 in the diary type. Specifically, in operation S630, the personalized service system 100 may record, via the metadata management unit 130, the at least one of event information and context information having reflected the user's location, the user's condition, the user's emotional state, or the event occurrence time, in the meta-database 135, as a user history.

As described above, a personalized service method using a user history in a mobile terminal according to the present invention can provide a user with a differentiated personalized service based on the at least one of event information and context information occurring in the mobile terminal by recording the user history in a meta database in a diary type.

In operation S640, the personalized service system 100 displays a representing image corresponding to the at least one of event information and context information, having been recorded in the diary type. As an example, in operation S640, the personalized service system 100 may display brief information about the event information in the diary type using an event icon which shows an event content, the event occurrence time, the user's location, or an emoticon which shows the user's emotional state. As another example, in operation S640, as illustrated in FIG. 3, the personalized service system 100 may display detailed information about the event content, the event occurrence time, the user's location, or the user's emotion information when the representing image is selected by the user. As still another example, in operation S640, the personalized service system 100 may display detailed record information about the event along with the representing image corresponding to the event context, the event occurrence time, the user's location, or the user's emotion information. As yet another example, in operation S640, the personalized service system 100, as illustrated in FIG. 7, may display detailed record information about the user history on a selected date of a diary.

Figure 7:
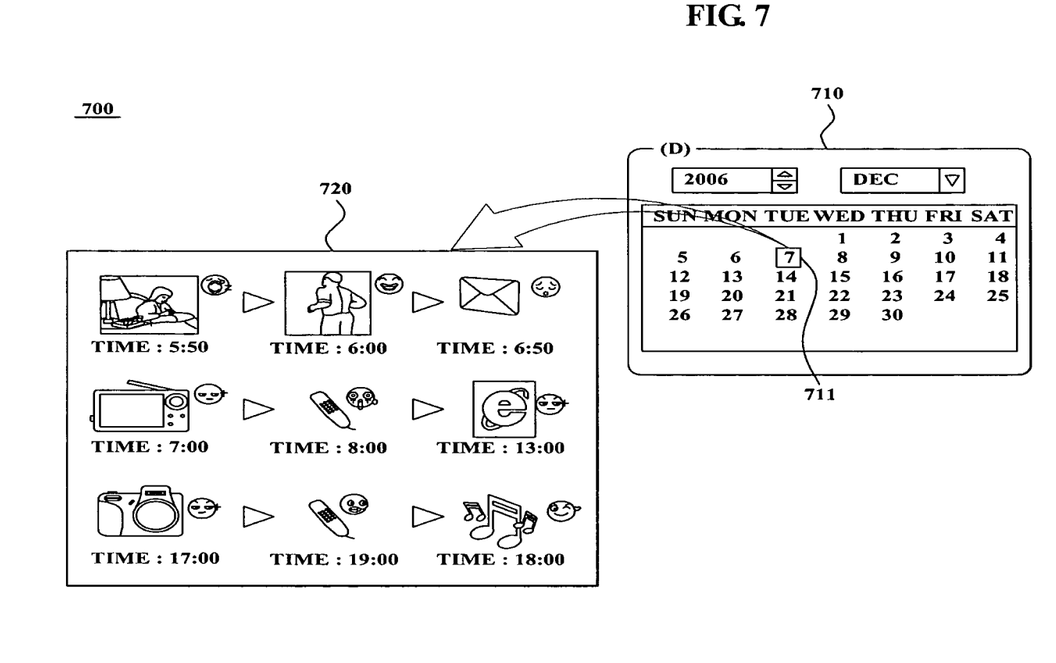
FIG. 7 is a diagram illustrating an example of history information with respect to a selected date of a diary in a mobile terminal according to an embodiment of the present invention.

FIG. 7 is a diagram illustrating an example of history information with respect to a selected date of a diary in a mobile terminal according to the present invention.

Referring to FIG. 7, a detailed display 700 with respect to the selected date of the diary using a user history of the mobile terminal is illustrated. Illustrated are a calendar display 710 which provides dates information and day information of a calendar using the user history, a date 711 selected by the user on the calendar display, and history information 720 corresponding to the date 711 selected by the user.

In operation S650, the personalized service system 100 determines whether a menu is selected among menus included in the brief information about the event displayed in the diary type.

When a menu is selected, in operation S660, the personalized service system 100 refers to the at least one of event information and context information, having been recorded in the diary type, and automatically performs a subsequent operation according to the selected menu.

As an example, when the user selects the music play menu in operation S660, the personalized service system 100 refers to the at least one of event information and context information, having been recorded in the diary type, and automatically performs a subsequent operation according to the selected music play menu to play frequently played music when the music play menu is selected.

As another example, when the user selects a broadcast menu, in operation S660, the personalized service system 100 refers to the at least one of event information and context information, having been recorded in the diary type, and automatically performs a subsequent operation according to the selected broadcast menu to provide a frequently selected channel when the broadcasting menu is selected.

As still another example, when the user selects an Internet connection menu, in operation S660, the personalized service system 100 refers to the at least one of event information and context information, having been recorded in the diary type, and automatically performs a subsequent operation according to the selected Internet connection menu to connect a frequently visited site when the user usually selects the Internet connection menu.

Consequently, the personalized service method using the user history in the mobile terminal according to an embodiment of the present invention can understand a user's inclination based on a user history using the mobile terminal, and can provide an automation service of the mobile terminal according to the user's inclination.

Also, as illustrated in FIG. 5, the personalized service method using the user history in the mobile terminal according to an embodiment of the present invention further includes, forming a community with other users via a network connection environment or a web connection environment, and sharing user diary information via the community by the mobile terminals 501 through 506.

As described above, the personalized service method using the user history in the mobile terminal according to an embodiment of the present invention can check a user's daily schedule since the user's daily schedule is recorded in a diary type, and can share the diary with other persons in a community the user belongs to. In this instance, the function of the sharing of the diary with the other persons in the community may guarantee privacy since the user can limit items and a range for the sharing. As an example, in the personalized service method using the user history in the mobile terminal according to the present invention, the user can present a brand new Korean pop song to a user's friend based on the friend's user history after checking and determining, via the community, the friend frequently listens to Korean pop songs. Also, in the personalized service method using the user history in the mobile terminal according to the present invention, the user may take an appropriate action for a friend based on the friend's emotional state after checking the friend's emotional state via a user history.

Subsequently, the personalized service method using the user history in the mobile terminal according to an embodiment of the present invention can communicate with other people in a community by sharing information about sequential events occurring in the mobile terminal.

Also, the personalized service method using the user history in the mobile terminal according to an embodiment of the present invention can provide a personalized search service since user's inclination can be easily understood in terms of information search. As an example of the personalized search service, an interested context of the user is understood based on information about a query context inputted by the user and visited sites by the user when the user does web searching, subsequently a push-up service with respect to information about the interested context is provided based on the interested context of the user.

Also, the personalized service method using the user history in the mobile terminal according to an embodiment of the present invention can collect more accurate information by analogizing a user's inclination via interoperation with the mobile terminal which is carried by the user at all times.

The personalized service method according to the above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the above-described embodiments of the present invention, a personalized service method and a system using the method may provide the user with a differentiated personalized service by collecting interactions and context information occurring between a user and a mobile terminal, and managing the collected interactions and context information as a user history.

Also, according to the above-described embodiments of the present invention, a personalized service method and a system using the method may communicate with other people in a community by sharing information about sequential events occurring in a mobile terminal.

Also, according to the above-described embodiments of the present invention, a personalized service method and a system using the method may understand a user inclination based on a user history by using a mobile terminal, and provide the user with an automation service for the mobile terminal according to the user's inclination.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A personalized service providing method comprising:
identifying first event information associated with a first menu selected by a user, the first menu being performed on a user terminal;
determining first context information according to the first event information, the first context information including a location at which the first event information occurs and a time at which the first event information occurs;
recording the first event information with the first context information in a user history;
identifying second event information associated with a second menu selected by the user, the second menu being performed on the user terminal;
determining second context information according to the second event information, the second context information including a location at which the second event information occurs and a time at which the second event information occurs; and
automatically performing a subsequent operation related to the second event information based on second context information and the user history,
wherein the first context information includes a user behavior associated with the first event information, and
wherein the subsequent operation is an operation frequently selected by the user after the second menu is selected.

2. The personalized service providing method of claim 1, wherein the user history includes first context information matched with a plurality of first event information aligned with flow of time.

3. The personalized service providing method of claim 2, wherein the user history includes the first context information matched with the plurality of first event information in a diary type.

4. The personalized service providing method of claim 2, wherein the plurality of first event information includes first event information frequently occurring according to an interaction between the user terminal and the user before the identified first event information occurs.

5. The personalized service providing method of claim 1, wherein the first context information further includes at least one of the user's emotional state when the first event information occurs.

6. The personalized service providing method of claim 5, wherein the user's emotional state is determined by at least one of the user's communication speed or speech tone based on a speech communication pattern of the user.

7. The personalized service providing method of claim 5, wherein the user's emotional state is determined by a variation of a vital signal of the user.

8. The personalized service providing method of claim 1, wherein the location corresponds to a location of the user terminal at which the first event information occurs.

9. The personalized service providing method of claim 1, wherein the user history is shared with other users via a community based on the user's inclination derived from the user history.

10. A device comprising:
a display configured to display a content;
a memory configured to store a user history; and
a processor configured to:
identify first event information associated with a first menu selected by a user, the first menu being performed on the device and corresponding to the content;
determine first context information according to the first event information, the first context information including a location at which the first event information occurs and a time at which the first event information occurs;
record the first event information with the first context information in the user history;
identify second event information associated with a second menu selected by the user, the second menu being performed on the device;
determine second context information according to the second event information, the second context information including a location at which the second event information occurs and a time at which the second event information occurs; and
automatically perform a subsequent operation related to the second event information based on second context information and the user history,
wherein the first context information includes a user behavior of the user associated with the first event information, and
wherein the subsequent operation is an operation frequently selected by the user after the second menu is selected.

11. The device of claim 10, wherein the user history includes first context information matched with a plurality of first event information aligned with flow of time.

12. The device of claim 11, wherein the user history includes first context information matched with the plurality of first event information in a diary type.

13. The device of claim 11, wherein the plurality of first event information includes first event information frequently occurring according to an interaction between the device and the user before the identified first event information occurs.

14. The device of claim 10, wherein the first context information includes at least one of the user's emotional state when the first event information occurs.

15. The device of claim 14, wherein the user's emotional state is determined by at least one of the user's communication speed or speech tone based on a speech communication pattern of the user.

16. The device of claim 14, wherein the user's emotional state is determined by a variation of a vital signal of the user.

17. The device of claim 10, wherein the location corresponds to a location of the device at which the first event information occurs.

18. The device of claim 10, wherein the user history is shared with other users via a community based on the user's inclination derived from the user history.

* * * * *